（12）United States Patent
Fujitake

(10) Patent No.: US 7,886,857 B2
(45) Date of Patent: Feb. 15, 2011

(54) VEHICLE EQUIPPED WITH ELECTRICAL STORAGE DEVICE, AND CHARGING CABLE

(75) Inventor: Yoshinori Fujitake, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 122 days.

(21) Appl. No.: 12/457,196

(22) Filed: Jun. 3, 2009

(65) Prior Publication Data
US 2009/0301801 A1 Dec. 10, 2009

(30) Foreign Application Priority Data
Jun. 5, 2008 (JP) ............................. 2008-147964

(51) Int. Cl.
*B60W 10/26* (2006.01)
(52) U.S. Cl. ............... 180/65.29; 180/2.1; 903/907; 320/165
(58) Field of Classification Search ............ 180/2.1, 180/65.265, 65.27, 65.275, 65.285, 65.29; 903/906, 907; 320/137, 165
See application file for complete search history.

(56) References Cited

U.S. PATENT DOCUMENTS 5,157,319 A * 10/1992 Klontz et al. .............. 320/108
5,272,431 A * 12/1993 Nee ........................... 320/109
5,758,414 A * 6/1998 Ehrenfels ...................... 29/857

FOREIGN PATENT DOCUMENTS

| JP | A-05-276674 | 10/1993 |
| JP | A-07-123517 | 5/1995 |
| JP | A-11-18279 | 1/1999 |

OTHER PUBLICATIONS

Office Action issued in Japanese Patent Application No. 2008-147964, on Apr. 27, 2010 (with partial translation).

* cited by examiner

*Primary Examiner*—J. Allen Shriver, II
*Assistant Examiner*—John D Walters
(74) *Attorney, Agent, or Firm*—Oliff & Berridge, PLC

(57) ABSTRACT

A vehicle includes a charging inlet for connection with a ground line and a pair of power lines used to charge an electrical storage device from outside the vehicle; a terminal of the charging inlet for connection with the ground line; and a GND relay that connects the terminal to a body earth of the vehicle. Desirably, the vehicle further includes an ECU that controls charging of the electrical storage device. Before charging of the electrical storage device is started after the pair of power lines and the ground line are connected to the charging inlet, the ECU opens the GND relay and then determines whether there is a disconnection in the ground line.

10 Claims, 9 Drawing Sheets

VEHICLE EQUIPPED WITH ELECTRICAL STORAGE DEVICE, AND CHARGING CABLE

INCORPORATION BY REFERENCE

The disclosure of Japanese Patent Application No. 2008-147964 filed on Jun. 5, 2008 including the specification, drawings and abstract is incorporated herein by reference in its entirety.

BACKGROUND OF THE INVENTION

1. Field of the Invention

The invention relates to a vehicle equipped with an electrical storage device, and a charging cable for charging the electrical storage device from outside the vehicle.

2. Description of the Related Art

Japanese Patent Application Publication No. 5-276674 (JP-A-5-276674) describes a charging apparatus for an electric vehicle. The charging apparatus includes a charging cable that has a pair of power lines for charge output and a ground line for connection with a vehicle body. Before charging is started, electric potentials of these power lines and ground line are detected to check a potential difference between a storage battery and the vehicle body. When it is determined that there is a leakage, measures, such as warning notification and charging operation lockup, are taken. Alternatively, when a leakage current is detected between the power lines and then it is determined that there is no ground fault in a direct-current line on the basis of the detected leakage current, charging is started.

The technique described in JP-A-5-276674 does not particularly refer to a disconnection fault. However, the power cable is repeatedly attached to and detached from the vehicle body, so it is necessary to consider that a wire disconnection may occur in the cable. Particularly, if there is a disconnection in the ground line, it is difficult to, for example, properly detect a leakage. In this case, it is desirable to be able to immediately identify the fault.

SUMMARY OF THE INVENTION

The invention provides a vehicle, equipped with an electrical storage device, and a charging cable that are able to immediately locate a fault related to charging.

A first aspect of the invention provides a vehicle. The vehicle includes: an electrical storage device; a connecting portion for connection with a first power line, a second power line and a ground line, wherein the first power line and the second power line are used to charge the electrical storage device from outside the vehicle; a terminal that is provided at the connecting portion, and is connected with the ground line; and a ground relay that connects the terminal to a body ground of the vehicle.

The vehicle may further include a control unit that controls charging of the electrical storage device, and, before charging of the electrical storage device is started after the first power line, the second power line and the ground line are connected to the connecting portion, the control unit may open the ground relay and then may determine whether there is a disconnection in the ground line.

The vehicle may further include a current sensor that is used to control charging of the electrical storage device, and, when charging of the electrical storage device is temporarily interrupted to calibrate the current sensor after the charging is started, the control unit may open the ground relay and then may determine whether there is a disconnection in the ground line.

The vehicle may further include an electric motor that receives electric power from the electrical storage device to generate power for propelling the vehicle.

The vehicle may further include an internal combustion engine that generates power for propelling the vehicle together with the electric motor.

A second aspect of the invention provides a charging cable. The charging cable includes: a pair of power lines for charging an electrical storage device of a vehicle from outside the vehicle; a ground line for grounding a body ground of the vehicle; a power line breaking relay that is provided in the pair of power lines; and a ground line breaking relay that is provided in the ground line.

The charging cable may further include a control unit that controls the power line breaking relay and the ground line breaking relay, and, before charging of the electrical storage device is started after the pair of power lines and the ground line are connected to the vehicle, the control unit may open the ground line breaking relay and then may determine whether there is a disconnection in the ground line.

The vehicle may further include a current sensor that is used to control charging of the electrical storage device, and, when charging of the electrical storage device is temporarily interrupted to calibrate the current sensor after the charging is started, the control unit may open the ground line breaking relay and then may determine whether there is a disconnection in the ground line.

The vehicle may include an electric motor that receives electric power from the electrical storage device to generate power for propelling the vehicle.

The vehicle may further include an internal combustion engine that generates power for propelling the vehicle together with the electric motor.

According to the aspects of the invention, it is possible to immediately locate a fault when charging is performed, and, therefore, it is possible to quickly undergo repair, or the like.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
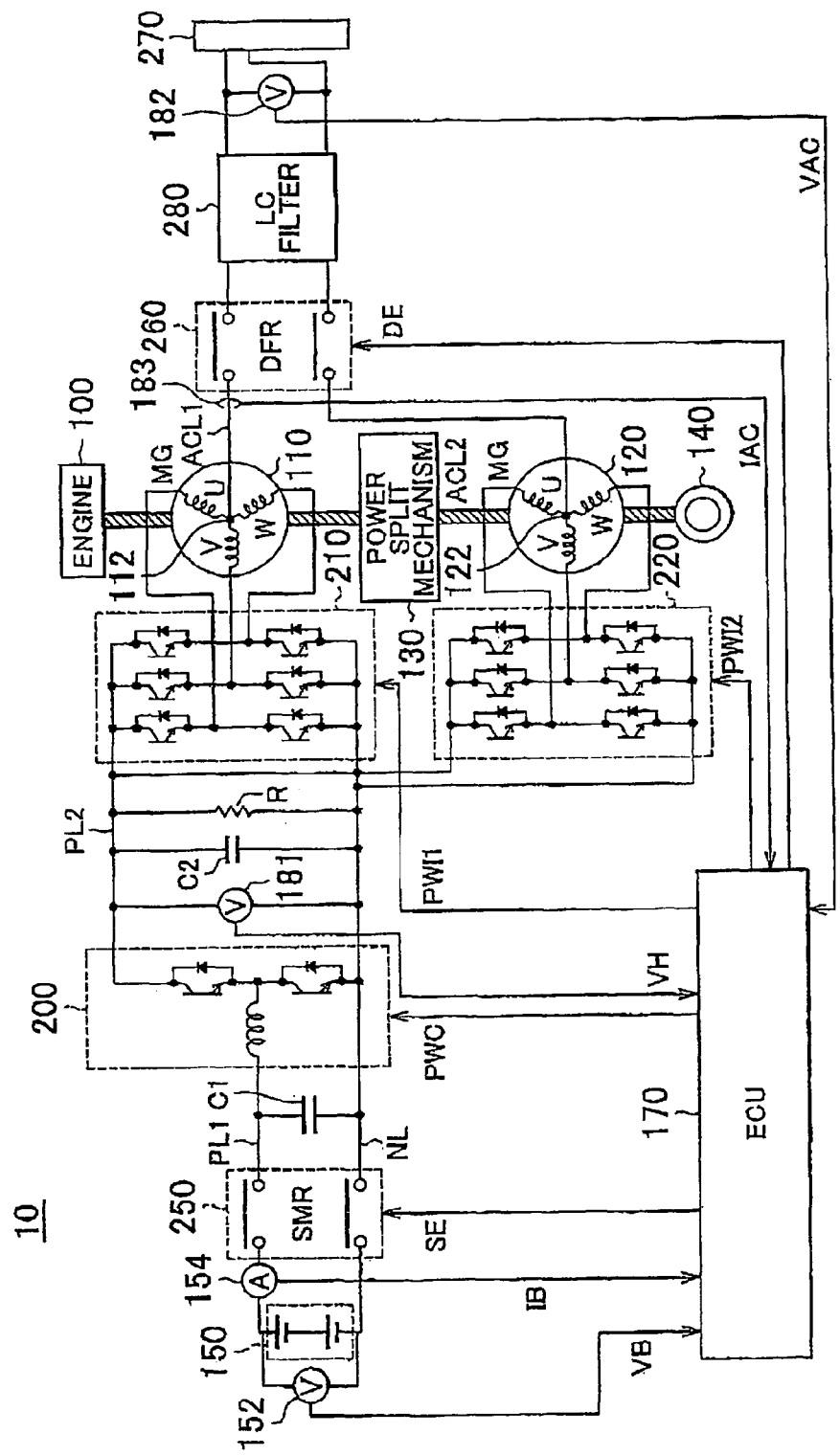
FIG. 1 is a view that shows a powertrain configuration of a hybrid vehicle, which is an example of an electric vehicle, according to an embodiment of the invention.

Hereinafter, embodiments of the invention will be described in detail with reference to the accompanying drawings. Note that like reference numerals denote like or corresponding components in the drawings, and the description thereof will not be repeated.

First Embodiment

FIG. 1 is a view that shows a powertrain configuration of a hybrid vehicle, which is an example of an electric vehicle, according to an embodiment of the invention.

Referring to FIG. 1, the hybrid vehicle 10 includes an engine 100, a first motor generator (MG) 110, a second motor generator (MG) 120, a power split mechanism 130, and drive wheels 140.

The hybrid vehicle 10 further includes an electrical storage device 150, a system main relay (SMR) 250, a step-up converter 200, a first inverter 210, a second inverter 220, a first capacitor C1, a second capacitor C2, a discharging resistance R, and a voltage sensor 181.

The hybrid vehicle 10 further includes power input lines ACL1 and ACL2, a dead front relay (DFR) 260, an LC filter 280, a charging inlet 270, a voltage sensor 182, a current sensor 183, and an ECU 170.

The engine 100, the first MG 110 and the second MG 120 are coupled to the power split mechanism 130. Then, the hybrid vehicle 10 runs on the driving force transmitted from at least any one of the engine 100 and the second MG 120. The power generated by the engine 100 is split into two paths by the power split mechanism 130. That is, one of the paths transmits the power to the drive wheels 140, and the other one of the paths transmits the power to the first MG 110.

The first MG 110 and the second MG 120 are alternating-current motors, and are, for example, three-phase alternating-current synchronous motors. The first MG 110 and the second MG 120 each include a Y-connected three-phase coil as a stator coil. The first MG 110 generates electric power using the power of the engine 100 split from the power split mechanism 130. For example, when the state of charge (hereinafter, also referred to as "SOC") of the electrical storage device 150 is lower than a predetermined level, the engine 100 starts up, and the first MG 110 generates electric power. Thus, the electrical storage device 150 is charged.

The second MG 120 uses at least any one of the electric power stored in the electrical storage device 150 and the electric power generated by the first MG 110 to generate driving force. Then, the driving force of the second MG 120 is transmitted to the drive wheels 140. Thus, the second MG 120 assists the engine 100 or drives the vehicle using the driving force from the second MG 120.

Note that, when the vehicle brakes, the second MG 120 is driven by the drive wheels 140, and the second MG 120 operates as a generator. Thus, the second MG 120 functions as a regenerative brake that converts running energy into electric power to generate braking force. Then, the electric power generated by the second MG 120 is stored in the electrical storage device 150.

The power split mechanism 130 includes a planetary gear train that has a sun gear, pinion gears, a carrier, and a ring gear. The pinion gears each engage the sun gear and the ring gear. The carrier rotatably supports the pinion gears, and is coupled to a crankshaft of the engine 100. The sun gear is coupled to a rotary shaft of the first MG 110. The ring gear is coupled to a rotary shaft of the second MG 120 and the drive wheels 140.

The electrical storage device 150 is a chargeable and dischargeable direct-current power supply. The electrical storage device 150 includes a secondary battery, such as a nickel metal hydride battery and a lithium ion battery. The voltage of the electrical storage device 150 is, for example, about 200 V. The electrical storage device 150 stores not only electric power generated by the first MG 110 and the second MG 120 but also electric power supplied from a power supply outside the vehicle, as will be described later. Note that a large-capacitance capacitor may be employed as the electrical storage device 150. The electrical storage device 150 may be any electric power buffer that is able to temporarily store electric power generated by the first MG 110 and the second MG 120 and electric power from a power supply outside the vehicle and to supply the stored electric power to the second MG 120.

The SMR 250 is provided between the electrical storage device 150 and the step-up converter 200. The SMR 250 is a relay that electrically connects or disconnects the electrical storage device 150 to or from the step-up converter 200 and a voltage converter formed of the inverters 210 and 220. The SMR 250 is turned on or off by a control signal SE supplied from the ECU 170. That is, when the vehicle is running or when the electrical storage device 150 is being charged from a power supply outside the vehicle, the SMR 250 is turned on, and the electrical storage device 150 is electrically connected to the voltage converter. On the other hand, when the vehicle system is stopped, the SMR 250 is turned off, and the electrical storage device 150 is electrically disconnected from the voltage converter.

The first capacitor C1 is connected between a positive line PL1 and a negative line NL. The first capacitor C1 reduces a power fluctuation component in a positive line PL1 and a power fluctuation component in a negative line NL. The step-up converter 200 includes a reactor, an upper arm and a lower arm. The upper arm and the lower arm are connected in series between a positive line PL2 and the negative line NL. The upper and lower arms each include an npn transistor and a diode that is connected in antiparallel with the npn transistor. The reactor is connected between the positive line PL1 and a connection node between the upper and lower arms.

Note that an insulated gate bipolar transistor (IGBT) may be, for example, used as the npn transistor. In addition, instead of the npn transistor, a power switching element, such as a power metal oxide semiconductor field-effect transistor (MOSFET), may be used.

When electric power is supplied from the electrical storage device 150 to the first MG 110 or the second MG 120, the step-up converter 200, on the basis of a control signal PWC supplied from the ECU, boosts the voltage from the electrical storage device 150 and then supplies the boosted voltage to the first MG 110 or the second MG 120. In addition, when the electrical storage device 150 is charged, the step-up converter 200, on the basis of a control signal PWC, lowers the voltage supplied from the first MG 110 or the second MG 120 and then outputs the lowered voltage to the electrical storage device 150.

The second capacitor C2 is connected between the positive line PL2 and the negative line NL. The second capacitor C2 reduces a power fluctuation component in the positive line PL2 and a power fluctuation component in the negative line NL. The discharging resistance R is connected in parallel with the second capacitor C2. The discharging resistance R is able to discharge residual electric charge in the second capacitor C2. The voltage sensor 181 detects a voltage VH between the positive line PL2 and the negative line NL, and outputs the detected voltage to the ECU 170.

The first inverter 210 includes a U-phase arm, a V-phase arm and a W-phase arm. The U-phase arm, the V-phase arm and the W-phase arm are connected in parallel between the positive line PL2 and the negative line NL. Each of the arms includes two npn transistors that are connected in series with each other, and a diode is connected in antiparallel with each npn transistor. A connection node between the two npn transistors in each arm is connected to an end, different from a neutral point 112, of a corresponding one of coils in the first MG 110.

Then, on the basis of a control signal PWI1 supplied from the ECU 170, the first inverter 210 converts alternating-current power, generated by the first MG 110, into direct-current power and then supplies the direct-current power to the step-up converter 200. In addition, when the engine 100 starts up, the first inverter 210, on the basis of a control signal PWI1, converts direct-current power, supplied from the step-up converter 200, into alternating-current power and then supplies the alternating-current power to the first MG 110.

The second inverter 220 has a similar configuration to that of the first inverter 210. A connection node between the two npn transistors in each arm is connected to an end, different from a neutral point 122, of a corresponding one of coils in the second MG 120.

Then, on the basis of a control signal PWI2 supplied from the ECU 170, the second inverter 220 converts direct-current power, supplied from the step-up converter 200, into alternating-current power and then supplies the alternating-current power to the second MG 120. In addition, when the vehicle brakes, the second inverter 220, on the basis of a control signal PWI2, converts alternating-current power, generated by the second MG 120, into direct-current power and then supplies the direct-current power to the step-up converter 200.

Furthermore, when the electrical storage device 150 is charged from a power supply outside the vehicle, the first inverter 210 converts alternating-current power, applied to the neutral point 112 of the first MG 110 from the power supply outside the vehicle, into direct-current power on the basis of a control signal PWI1 supplied from the ECU 170 and then supplies the converted direct-current power to the step-up converter 200, and the second inverter 220 converts alternating-current power, applied to the neutral point 122 of the second MG 120 from the power supply outside the vehicle, into direct-current power on the basis of a control signal PWI2 supplied from the ECU 170 and then supplies the converted direct-current power to the step-up converter 200.

The DFR 260 is provided for a pair of power lines formed of a power input line ACL1 and a power input line ACL2. The power input line ACL1 is arranged between the neutral point 112 of the first MG 110 and the charging inlet 270. The power input line ACL2 is arranged between the neutral point 122 of the second MG 120 and the charging inlet 270. The DFR 260 is a relay that electrically connects or disconnects the charging inlet 270 to or from the neutral points 112 and 122. The DFR 260 is turned on or off by a control signal DE supplied from the ECU 170. That is, when the electrical storage device 150 is being charged from a power supply outside the vehicle, the DFR 260 is turned on, and the charging inlet 270 is electrically connected to the neutral points 112 and 122. On the other hand, when the electrical storage device 150 is not being charged from a power supply outside the vehicle, the DFR 260 is turned off, and the charging inlet 270 is electrically disconnected from the neutral points 112 and 122.

The LC filter 280 is provided between the DFR 260 and the charging inlet 270. When the electrical storage device 150 is being charged from a power supply outside the vehicle, the LC filter 280 prevents high-frequency noise, generated in accordance with switching operations of the first and second inverters 210 and 220, from being output to the power supply outside the vehicle.

The charging inlet 270 is a power interface for receiving electric power supplied from a power supply outside the vehicle for charging. When the electrical storage device 150 is charged from a power supply outside the vehicle, a connector of a charging cable is connected to the charging inlet 270 to supply electric power from the power supply outside the vehicle to the vehicle.

The voltage sensor 182 is provided between the LC filter 280 and the charging inlet 270. The voltage sensor 182 detects a voltage VAC between the power input line ACL1 and the power input line ACL2 and then outputs the detected voltage VAC to the ECU 170. The current sensor 183 is provided between the DFR 260 and the neutral point 112 of the first MG 110. When the electrical storage device 150 is charged from a power supply outside the vehicle, the current sensor 183 detects a voltage IAC flowing through the power input line ACL1 and outputs the detected voltage IAC to the ECU 170. Note that the current sensor 183 may be provided in the power input line ACL2 to detect an electric current flowing through the power input line ACL2.

The current sensor 154 measures an electric current at which the electrical storage device 150 is charged or an electric current at which the electrical storage device 150 is discharged, and then outputs the measured electric current to the ECU 170. The voltage sensor 152 measures a voltage between the terminals of the electrical storage device 150, and then outputs the measured voltage to the ECU 170.

The ECU 170 generates control signals for driving the SMR 250, the step-up converter 200, the first inverter 210, the second inverter 220 and the DFR 260, and controls operations of these devices.

Figure 2:
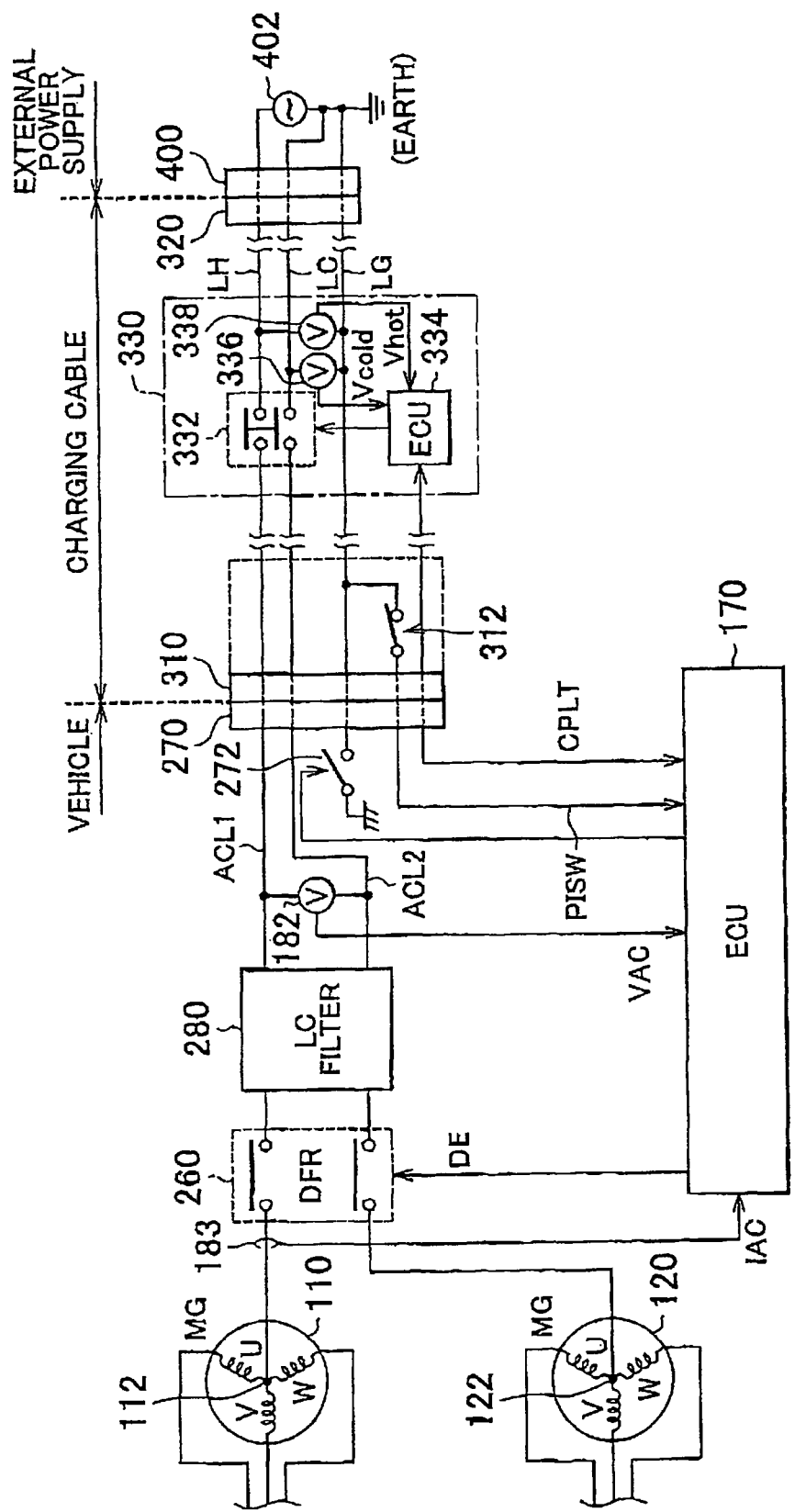
FIG. 2 is a schematic configuration diagram of a portion related to charging of the hybrid vehicle shown in FIG. 1.

FIG. 2 is a schematic configuration diagram of a portion related to charging of the hybrid vehicle 10 shown in FIG. 1. Referring to FIG. 2, a charging cable that couples the hybrid vehicle 10 to a power supply 402 outside the vehicle includes a connector 310, a plug 320 and a charging circuit interrupt device (hereinafter, also referred to as "CCID") 330.

The connector 310 is connectable to the charging inlet 270 provided for the vehicle. The connector 310 has a limit switch 312. Then, as the connector 310 is connected to the charging inlet 270, the limit switch 312 is activated, and then a cable connection signal PISW that indicates that the connector 310 is connected to the charging inlet 270 is input to the ECU 170.

The plug 320 is, for example, connected to an electrical outlet 400 provided in a house. The electrical outlet 400 is supplied with alternating-current power from the power supply 402 (for example, system power supply).

The CCID 330 includes a charging relay 332 and an ECU 334. The charging relay 332 is provided in a pair of power lines within the charging cable. The charging relay 332 is turned on or off by the ECU 334. Then, when the charging relay 332 is turned off, an electric circuit is interrupted in the charging cable. On the other hand, when the charging relay 332 is turned on, it is allowed to supply electric power from the power supply 402 to the hybrid vehicle 10.

The ECU 334 outputs a pilot signal CPLT through the connector 310 and the charging inlet 270 to the ECU 170 of the vehicle. The ECU 334 informs the ECU 170 of the vehicle of a pilot signal CPLT that indicates a rated current. The pilot signal CPLT includes a signal for remotely operating the charging relay 332 from the ECU 170 on the basis of the potential of the pilot signal CPLT operated by the ECU 170. Then, the ECU 334 turns on or off the charging relay 332 on the basis of a variation in the potential of the pilot signal CPLT.

The CCID 330 further includes a voltage sensor 336 and a voltage sensor 338. The voltage sensor 336 measures a voltage Vcold between a ground line LG and a cold power line LC. The voltage sensor 338 measures a voltage Vhot between the ground line LG and a hot power line LH.

Before charging is started after the cable has been connected, if there is a disconnection in the ground line LG and the ground line LG is not connected to a ground of the external power supply when the charging relay 332 is open and a GND relay 272 is open, the voltages Vcold and Vhot measured respectively by the voltage sensors 336 and 338 are unstable and are not measured properly. Thus, a disconnection may be detected.

Figure 3:
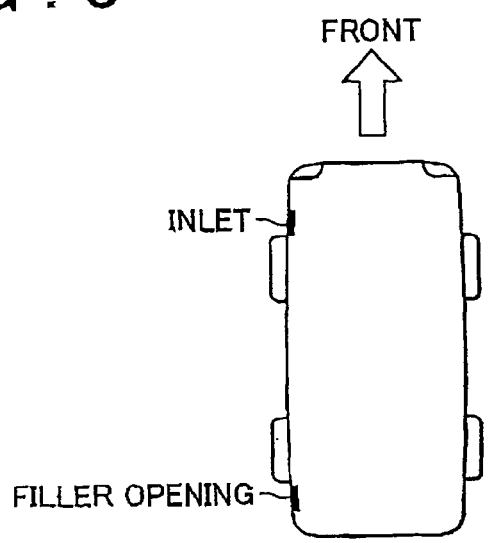
FIG. 3 is a view that illustrates a position of a charging inlet.

FIG. 3 is a view that illustrates a position of the charging inlet 270. FIG. 3 schematically shows a state of the vehicle as viewed from above, and the charging inlet 270 is provided on a left side of the vehicle before a left front wheel. Note that FIG. 3 shows an example in which the charging inlet 270 is separately provided from the filler opening for refueling fuel, such as gasoline, and the filler opening is provided on the left side of the vehicle behind a left rear wheel.

Figure 4:
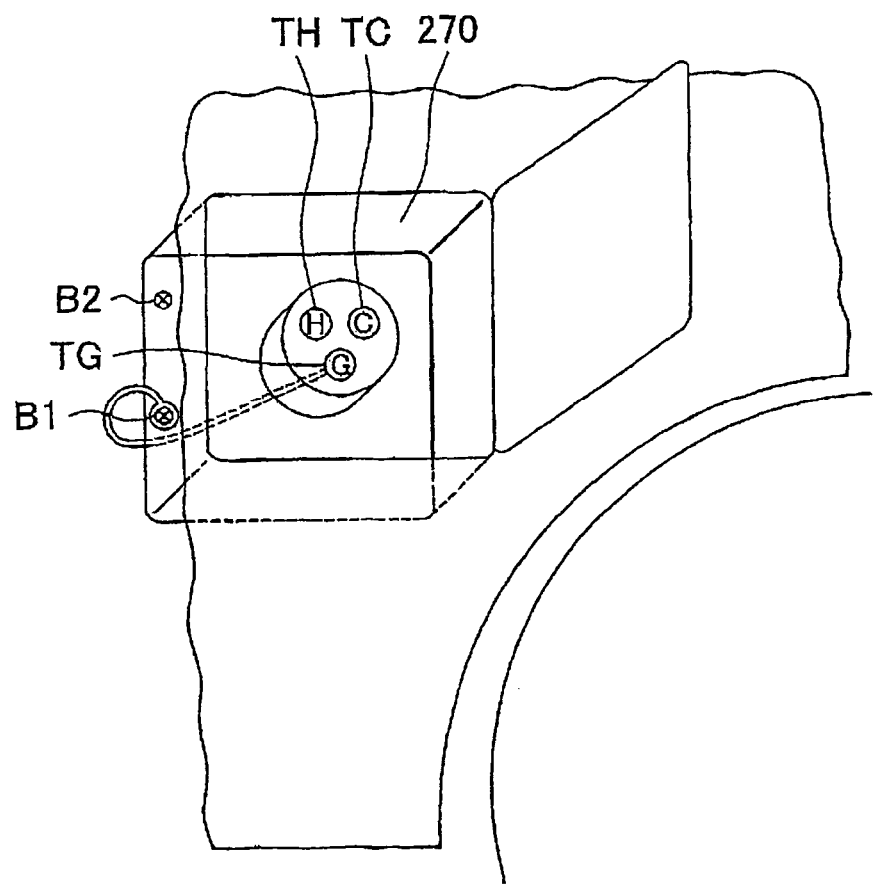
FIG. 4 is a view that shows the shape of the charging inlet.

FIG. 4 is a view that shows the shape of the charging inlet 270. Referring to FIG. 4, when a lid located on a side to the left front wheel is opened, the charging inlet 270 appears. The charging inlet 270 includes a terminal TH for connection with a Hot line of the pair of power lines, a terminal TC for connection with a Cold line of the pair of power lines, and a terminal TG for connection with the ground line. Although not shown in the drawing, a terminal for connection between a communication line of the ECU 334 and a communication line of the ECU 170 may be further provided.

A box for accommodating the charging inlet 270 is connected to a steel plate or frame of a vehicle body by screws B1 and B2. The terminal TG is electrically connected to the screw B1 of the box through a wire, thus being connected to a body ground. Although not shown in FIG. 4 for easy description, the GND relay 272 shown in FIG. 2 is provided between the terminal TG and the screw B1.

Figure 5:
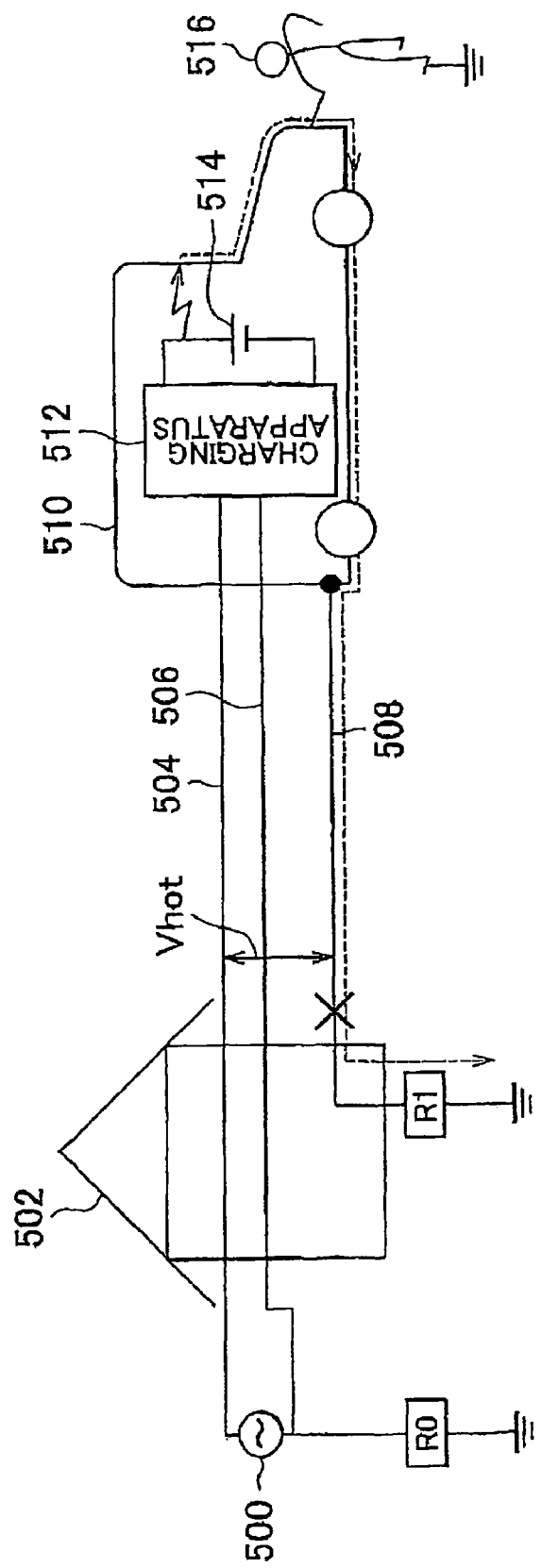
FIG. 5 is a view that illustrates a first study example for detecting a disconnection in a ground line.

Here, some study examples for detecting a disconnection in a ground line will be described. FIG. 5 is a view that illustrates a first study example for detecting a disconnection in a ground line.

Referring to FIG. 5, an external power supply 500 provided at a home 502 is connected to a vehicle 510 by a Hot line 504, a Cold line 506 and a ground line 508. Electric power is supplied through the Hot line 504 and the Cold line 506 to a charging apparatus 512. The charging apparatus 512 rectifies alternating current and boosts the voltage to charge a battery 514.

When the ground line 508 is properly connected to an earth with a low grounding resistance R1, even when a leakage current flows from a high voltage side of the battery during charging, the leakage current flows from a vehicle body through the ground line 508 to the earth.

However, there may be a disconnection in the ground line 508, so it is necessary to check the ground line 508 for a disconnection. Then, a voltage Vhot between the Hot line 504 and the ground line 508 is measured. If a normal value (for example, 100 V) is acquired as the measurement result, it may be determined that there is no disconnection in the ground line 508 or in the Hot line 504. On the other hand, if the measurement result does not indicate a normal value, it may be determined that there is an abnormality in any one of the ground line 508 and the Hot line 504.

Figure 6:
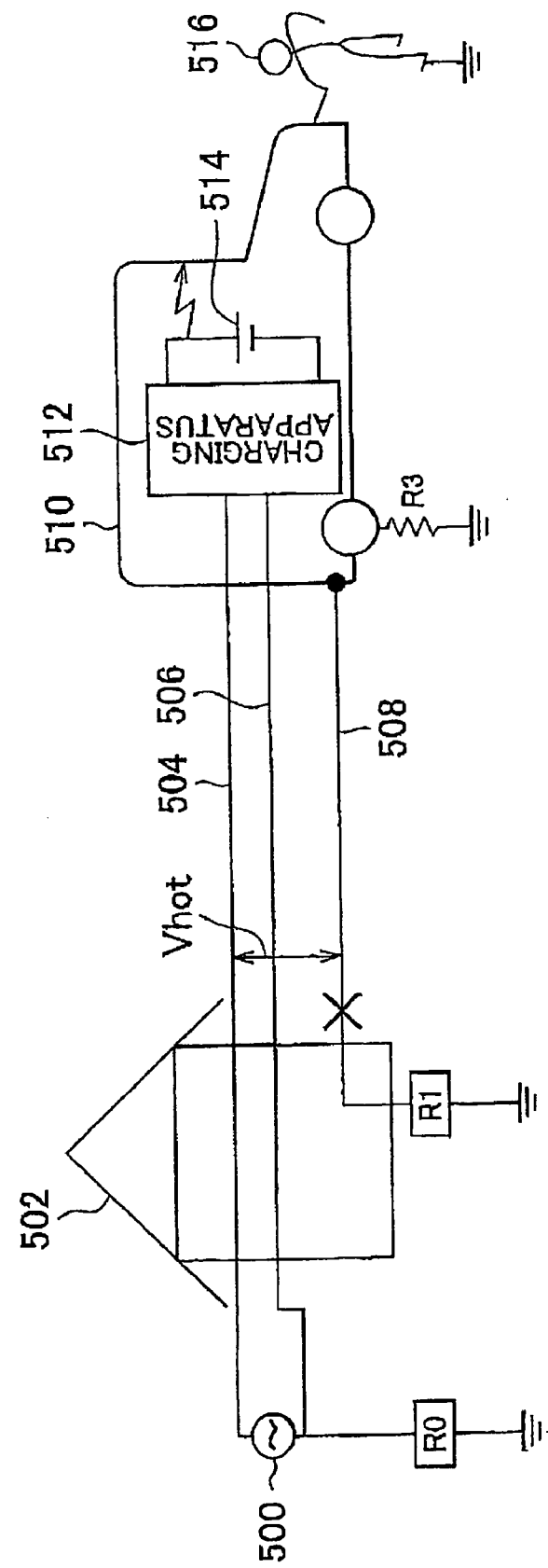
FIG. 6 is a view that illustrates a second study example for detecting a disconnection in a ground line.

FIG. 6 is a view that illustrates a second study example for detecting a disconnection in a ground line. FIG. 6 differs from FIG. 5 in that the body of the vehicle 510 is grounded by a resistance R3. The resistance R3 generally has a resistance value larger than that of the resistance R1. This state, for example, corresponds to a state where tires are wet because of rain.

When the voltage Vhot is measured in such a state, a standard ground potential is given through the resistance R3 even when there is a disconnection in the ground line 508, so the measurement result indicates a normal value in this case as well. In this way, there is a case where a disconnection cannot be detected even when the disconnection occurs in the ground line 508.

Then, in the present embodiment, the ground line 508 is checked for a disconnection in a state where the ground line is temporarily isolated from the body ground of the vehicle body 510. Specifically, it is only necessary that the voltage Vhot is measured in a state where the GND relay 272 shown in FIG. 2 is open.

Figure 7:
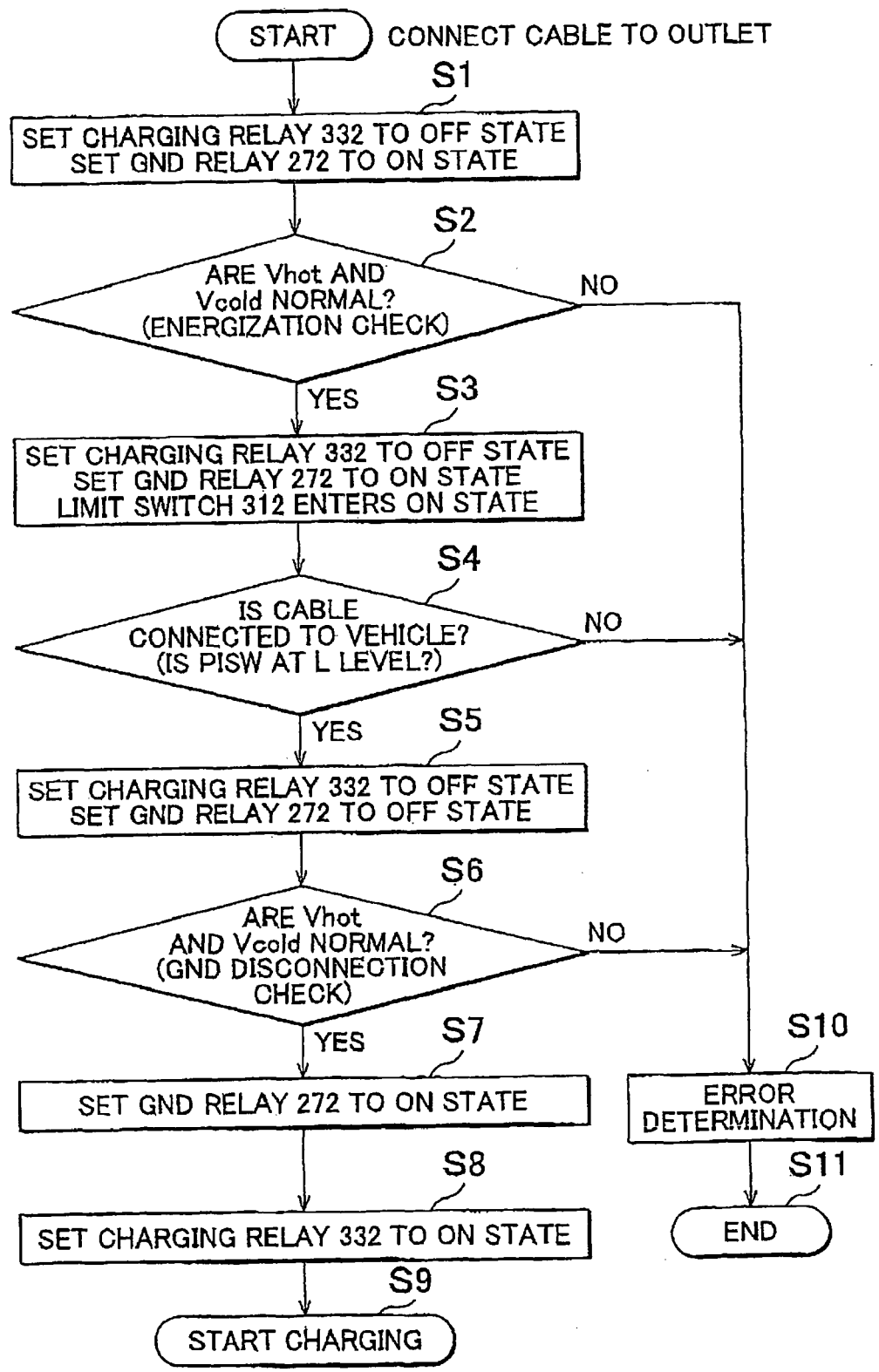
FIG. 7 is a flowchart that illustrates a control to check for a disconnection.

FIG. 7 is a flowchart that illustrates a control to check for a disconnection. Referring to FIG. 2 and FIG. 7, step S1 is carried out in a state where the cable is connected to the outlet. In step S1, the charging relay 332 is opened (off state), and the GND relay 272 is closed (on state).

Subsequently, the voltage sensors 336 and 338 are used to measure voltages Vhot and Vcold, and then it is determined whether the voltages Vhot and Vcold are normal. For example, whether the voltages Vhot and Vcold are normal is determined on the basis of whether the voltages Vhot and Vcold respectively fall within predetermined ranges (100 V+α, 0 V+α). In step S2, determination as to whether the external power supply 402 is properly connected to the charging cable, that is, energization check, is carried out.

In step S2, when any one of the voltages Vhot and Vcold is not normal, the process proceeds to step S10. In step S2, when both the voltages Vhot and Vcold are normal, the process proceeds to step S3.

In step S3, the charging relay 332 is set to the off state, and the GND relay 272 is set to the on state. In addition, as the connector 310 is connected to the charging inlet 270, the limit switch 312 enters an on state, and the cable connection signal PISW that indicates that the connector 310 is connected to the charging inlet 270 is input to the ECU 170.

In step S4, it is determined whether the cable is connected to the vehicle. The ECU 170 determines that the cable is connected to the vehicle when the cable connection signal PISW is at a ground potential (L level), and determines that the cable is not connected to the vehicle when the cable connection signal PISW is not at a ground potential (L level). In step S4, when it is determined that the cable is connected to the vehicle, the process proceeds to step S5. In step S4, when it is determined that the cable is not connected to the vehicle, the process proceeds to step S10.

In step S5, the charging relay 332 is set to the off state, and the GND relay 272 is also set to the off state. By setting the GND relay 272 to the off state, the ground line is never connected to the earth via the resistance R3 even when a disconnection occurs in the ground line as described with reference to FIG. 6. Thus, it is possible to detect a disconnection in the ground line.

Subsequent to step S5, in step S6, the voltages Vhot and Vcold are measured, and then it is determined whether the measurement results are normal. It is only necessary to make determination by setting a threshold similar to that in step S2; however, the measurement condition is different (the GND relay 272 is set to the off state), so it is more likely to detect a disconnection in the ground line.

In step S5, when any one of the voltages Vhot and Vcold is not normal, the process proceeds to step S10. In step S5, when both the voltages Vhot and Vcold are normal, the process proceeds to step S7.

In step S7, first, the GND relay 272 is set to the on state. Then, in step S8, the charging relay 332 is set to the on state. After that, in step S9, charging of the electrical storage device is started.

When negative determination is made in any one of steps S2, S4 and S6, it is determined as an error in step S10, and charging is stopped. Then, in step S11, the process ends. If the status indicating an energization check error (NO in step S2), an inlet no connection error (NO in step S4) or a ground line disconnection error (NO in step S6) is stored or displayed in step S10, it is desirable that it is convenient to take measures against the fault.

Figure 8:
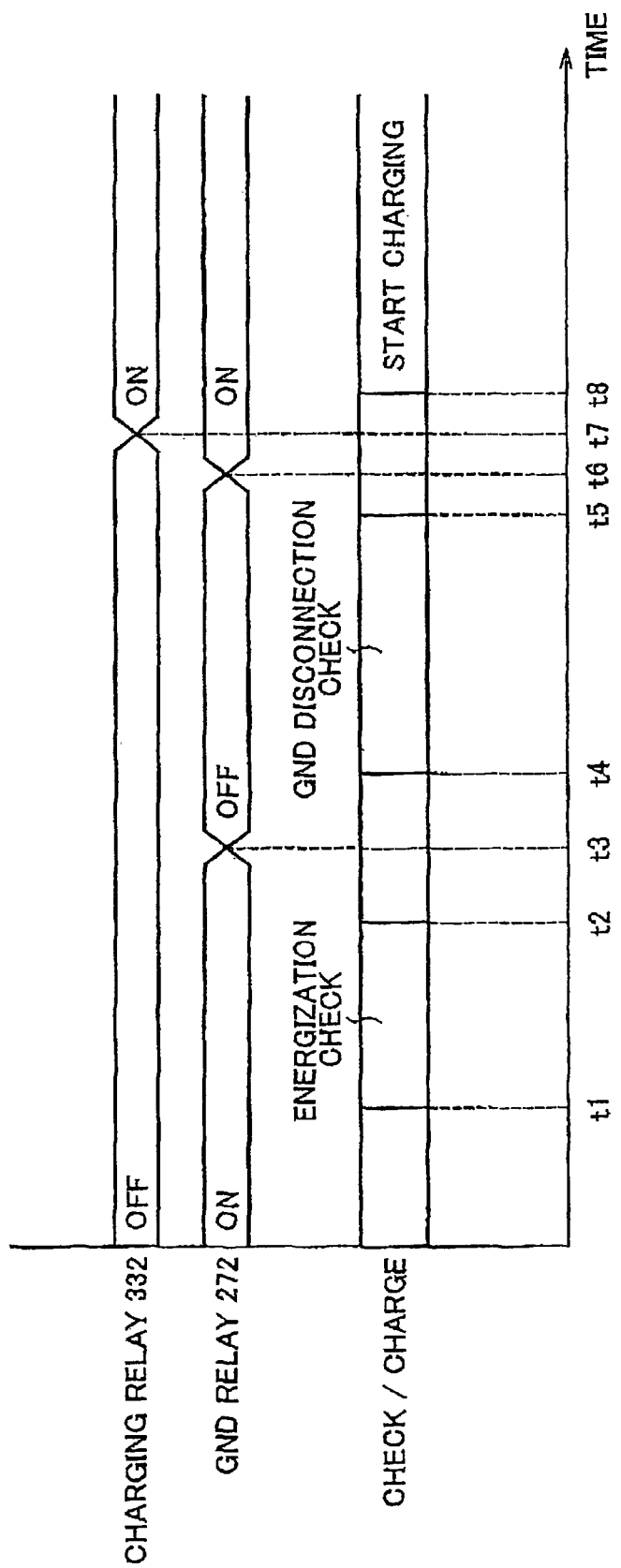
FIG. 8 is a view that illustrates timings at which checks are performed before charging is normally started.

FIG. 8 is a view that illustrates timings at which checks are performed before charging is properly started.

Referring to FIG. 8, an energization check as to whether the charging cable is properly connected to an external power supply is performed between time t1 to time t2 (step S2 in FIG. 7). At this time, the state of the charging relay 332 is in the off state, and the state of the GND relay 272 is in the on state.

Then, at time t3, the state of the GND relay is changed from the on state to the off state. After that, a GND disconnection check (step S6 in FIG. 7) is performed from time t4 to time t5.

If there is no problem in the disconnection check, the GND relay is changed from the off state to the on state at time t6, and the charging relay 332 is set to the on state at time t7.

Then, at time t8, supply of electric power is started from outside the vehicle, and charging of the electrical storage device is started. By carrying out the above control, it is possible to reliably detect a disconnection that occurs in the ground line.

Note that it is desirable that the energization check and the disconnection check are also performed after charging is started at constant intervals.

Figure 9:
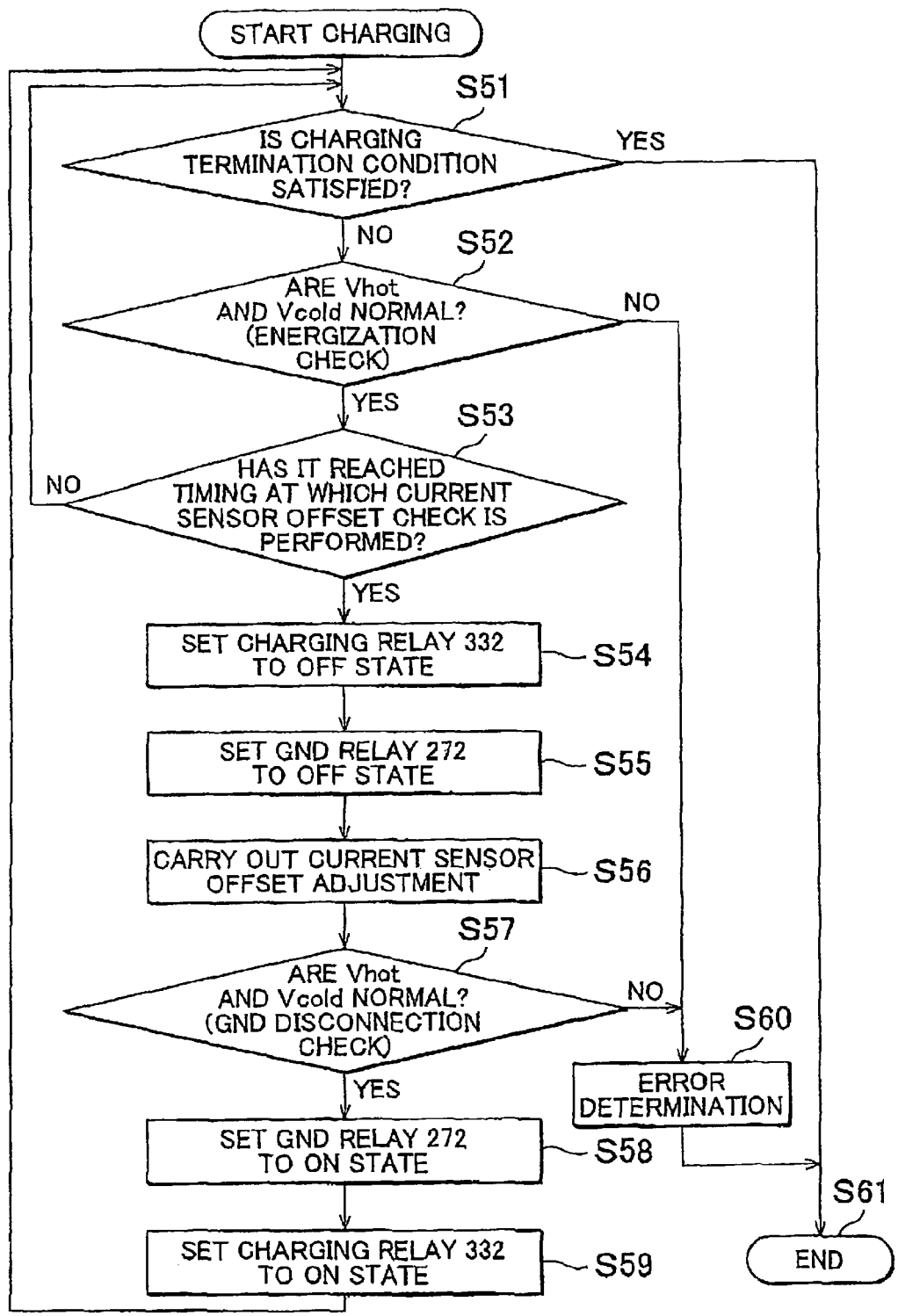
FIG. 9 is a flowchart that illustrates a check for a disconnection after charging is started.

FIG. 9 is a flowchart that illustrates a disconnection check after charging is started. During charging of the electrical storage device, it is necessary to accurately measure an electric current and acquire a proper state of charge. Because the current sensor tends to produce an offset error, a charging current is temporarily set at zero during charging to calibrate the current sensor. Then, the ground line may be checked for a disconnection at the same time.

Referring to FIG. 2 and FIG. 9, after charging is started, it is determined in step S51 whether a charging termination condition is satisfied. The charging termination condition is satisfied, for example, when the state of charge of the electrical storage device 150 reaches a charging target level close to an upper limit of management level or when the plug 320 or the connector 310 is unplugged from the electrical outlet 400 or the charging inlet 270.

When the charging termination condition is satisfied in step S51, the process proceeds to step S61 and then charging is terminated. When the charging termination condition is not satisfied in step S51, charging is continued. In this case, in step S52, the voltages Vhot and Vcold are measured, and then it is determined whether the measured voltages are normal. This is to perform a check similar to the energization check in step S2 of FIG. 7 while charging the electrical storage device.

In step S52, when it is determined that the measured voltages are normal, the process proceeds to step S53. In step S52, when it is determined that the measured voltages are not normal, the process proceeds to step S60.

In step S53, it is determined whether it has reached the timing at which a current sensor offset check is performed. The current sensor, for example, includes the current sensor 154, shown in FIG. 1, that detects a charging current IB to the electrical storage device 150. Other than that, it is desirable that the current sensor 183, a current sensor (not shown) that detects a stator coil current, and the like, undergo an offset check. However, the offset check need not be excessively frequent, and need not be carried out each time the energization check in step S52 is performed. The current sensor offset check is repeatedly carried out at appropriate intervals, that is, for example, every 30 minutes or once every 50 times of the check in step S52.

In step S53, when it is determined that it has not yet reached the timing at which the current sensor offset check is performed, the process returns to step S51. When it is determined in step S53 that it has reached the timing at which the current sensor offset check is performed, the process proceeds to step S54.

In step S54, the charging relay 332 is set to the off state. Then, in step S55, the GND relay 272 is also set to the off state. After that, charging is interrupted, and a charging current should be zero. Here, in step S56, a current sensor offset adjustment is carried out. At this time, a value detected by the current sensor is set at a zero point. That is, an offset of the current sensor is corrected.

Then, subsequent to the current sensor offset adjustment, in step S57, the voltages Vhot and Vcold are respectively measured by the voltage sensors 336 and 338, and then it is determined whether the measurement results each fall within a normal range. Because the GND relay 272 is set to the off state, it is possible to check the ground line LG for a disconnection, as well as step S6 in FIG. 7.

When a disconnection check is completed in step S57 and then the result is normal, the process proceeds to step S58. In step S58, the GND relay 272 is set to the on state. Subsequently, in step S59, the charging relay 332 is set to the on state to resume charging. As charging is resumed, the process returns from step S59 to step S51, and then a series of charging process is repeated.

When it is determined in step S52 or in step S57 that the voltages Vhot and Vcold are not normal, the process proceeds to step S60. In step S60, it is determined as an error, and charging is stopped. Then in step S61, the process ends.

Second Embodiment

Figure 10:
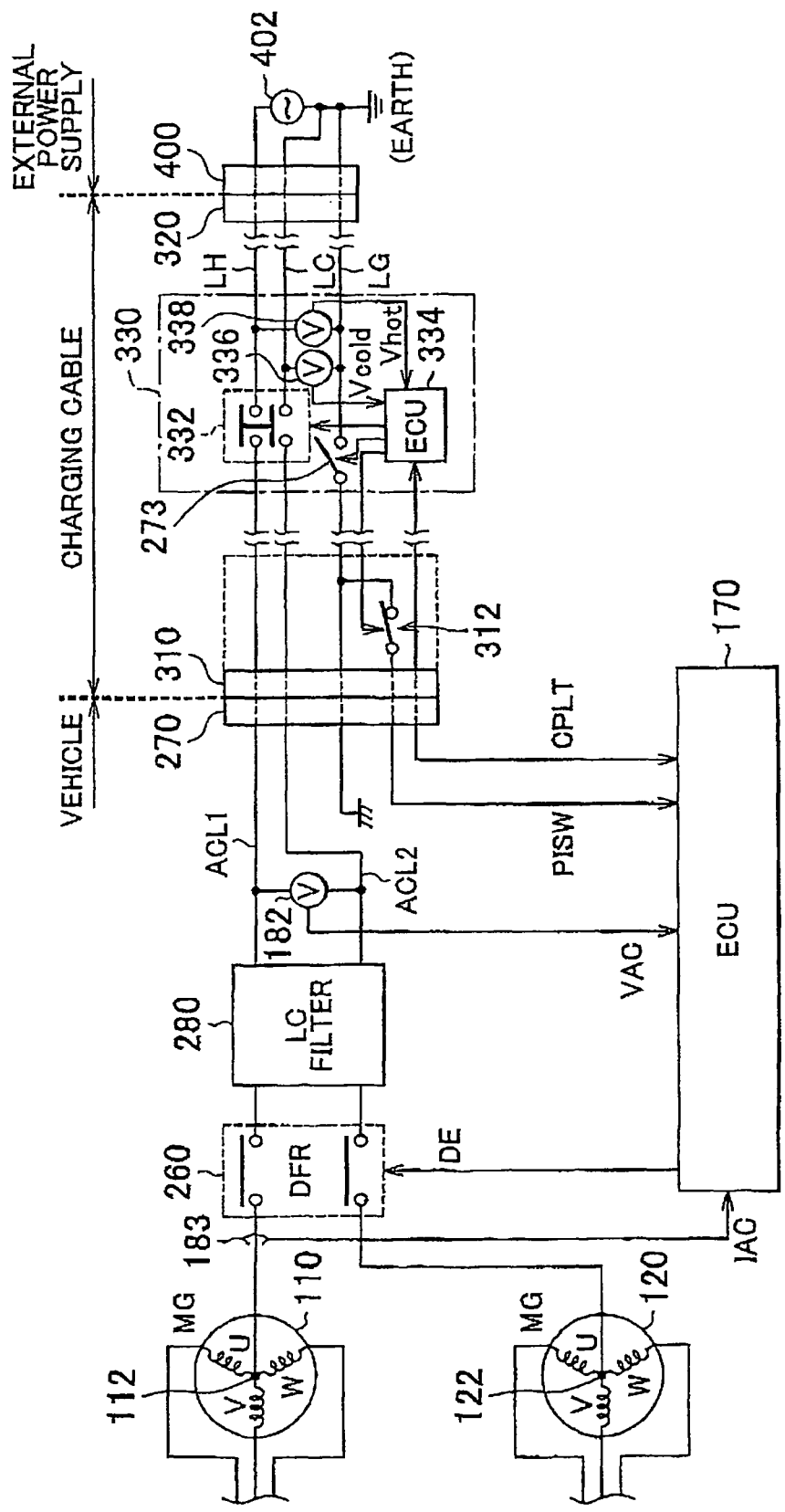
FIG. 10 is a schematic configuration diagram of a portion related to charging of a hybrid vehicle according to a second embodiment.

FIG. 10 is a schematic configuration diagram of a portion related to charging of a hybrid vehicle according to a second embodiment.

The configuration shown in FIG. 10 includes a GND relay 273 instead of the GND relay 272 in the configuration shown in FIG. 2. The GND relay 273 is provided inside the CCID 330 together with the charging relay 332. Note that the other portions of the configuration shown in FIG. 10 are already described with reference to FIG. 2, so the description thereof is not repeated. In addition, the ground line LG is checked for a disconnection by carrying out control similar to the control described with reference to FIG. 7 and FIG. 9, so the description thereof is not repeated.

As described in the second embodiment, by incorporating the GND relay not in the vehicle but in the CCID 330, it is possible to accurately detect a disconnection in the ground line for models that are not equipped with the GND relay.

Alternative Embodiment

In the configurations shown in FIG. 2 and FIG. 10, the voltage sensors 336 and 338 are arranged so as to check the voltages of the power lines LH and LC between the charging relay 332 and the plug 320; instead, the voltage sensors may be provided at the vehicle side.

In the configuration shown in FIG. 2, the voltage sensors 336 and 338 may be arranged at the vehicle side so that the voltage Vhot is measured between a terminal (HOT side) connected to the power line of the charging inlet 270 and a terminal connected to the ground line, and the voltage Vcold is measured between a terminal (COLD side) connected to the power line of the charging inlet 270 and the terminal connected to the ground line, and then these voltages Vhot and Vcold may be monitored. In this case, it is desirable that the ground line is checked for a disconnection when the DFR 260 is open in a state where the charging relay 332 is connected.

In this manner, it is possible to detect a disconnection that occurs at a portion of the cable between the CCID 330 of the ground line LG and the connector 310.

Lastly, the embodiment of the application will be summarized with reference to FIG. 1, FIG. 2, and the like. In summary, the vehicle 10 according to the present embodiment is equipped with the electrical storage device 150, and is able to charge the electrical storage device 150 from outside the vehicle. The vehicle 10 includes a connecting portion (charging inlet 270) for connection with the ground line LG and the pair of power lines LH and LC used to charge the power electrical storage device 150 from outside the vehicle, a terminal that is provided at the connecting portion for connection with the ground line, and the GND relay 272 that connects the terminal to the body ground of the vehicle.

Desirably, the vehicle 10 further includes a control unit (ECU 170) that controls charging of the electrical storage device 150. Before charging of the electrical storage device 150 is started after the pair of power lines LH and LC and the ground line LG are connected to the connecting portion, the control unit opens the GND relay 272 and then determines whether there is a disconnection in the ground line LG.

More desirably, the vehicle 10 further includes the current sensor 154 used to control charging of the electrical storage device 150. When charging of the electrical storage device 150 is temporarily interrupted to calibrate the current sensor 154 after the charging is started, the control unit opens the GND relay 272 and then determines whether there is a disconnection in the ground line LG.

Desirably, the vehicle 10 further includes an electric motor (MG 120) that receives electric power from the electrical storage device 150 to generate power for propelling the vehicle.

More desirably, the vehicle further includes an internal combustion engine (engine 100) that generates power for propelling the vehicle together with the electric motor.

In addition, as shown in FIG. 1 and FIG. 10, the vehicle according to another embodiment is equipped with the electrical storage device 150, the charging cable for charging the vehicle that is able to charging the electrical storage device 150 from outside the vehicle includes the pair of power lines LH and LC for charging the electrical storage device from outside the vehicle, the ground line LG for grounding the body ground of the vehicle, a power line breaking relay (charging relay 332) provided in the power lines LH and LC, and a ground line breaking relay (GND relay 273) provided in the ground line LG.

Desirably, the charging cable further includes a control unit (ECU 334) that controls the power line breaking relay (charging relay 332) and the ground line breaking relay (GND relay 273). Before charging of the electrical storage device 150 is started after the pair of power lines LH and LC and the ground line LG are connected to the vehicle, the control unit opens the ground line breaking relay (GND relay 273) and then determines whether there is a disconnection in the ground line LG.

While the invention has been described with reference to what are considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. A vehicle comprising:
 an electrical storage device that is able to be charged from outside the vehicle;
 a connecting portion for connection with a pair of power lines used to charge the electrical storage device from outside the vehicle, and a ground line;
 a terminal that is provided at the connecting portion, and is connected with the ground line;
 a relay that connects the terminal to a body ground of the vehicle; and
 a control unit that controls charging of the electrical storage device, wherein the control unit opens the relay after the pair of power lines and the ground line are connected to the connecting portion and before charging of the electrical storage device is started, and determines, with the relay open, whether there is a disconnection in the ground line based on whether a voltage between at least one of the pair of power lines and the ground line is able to be detected normally.

2. The vehicle in which the electrical storage device is mounted according to claim 1,
 wherein the control unit determines whether there is a disconnection in the ground line based on a detection result obtained by a voltage sensor that detects the voltage between at least one of the pair of power lines and the ground line.

3. The vehicle in which the electrical storage device is mounted according to claim 1, further comprising:
 a current sensor that is used to control charging of the electrical storage device, wherein when charging of the electrical storage device is temporarily interrupted to calibrate the current sensor after the charging is started, the control unit opens the relay and determines whether there is a disconnection in the ground line.

4. The vehicle in which the electrical storage device is mounted according to claim 1, further comprising:
 an electric motor that receives electric power from the electrical storage device to generate power for propelling the vehicle.

5. The vehicle in which the electrical storage device is mounted according to claim 4, further comprising:

an internal combustion engine that generates power for propelling the vehicle together with the electric motor.

6. A charging cable for supplying electricity to a vehicle in which an electrical storage device is mounted and which is configured such that the electrical storage device is able to be charged from outside the vehicle, comprising:

a pair of power lines for charging the electrical storage device from outside the vehicle;

a ground line for grounding a body ground of the vehicle;

a power line breaking relay that is provided in the power lines;

a ground line breaking relay that is provided in the ground line; and a control unit that controls the power line breaking relay and the ground line breaking relay, wherein the control unit opens the ground line breaking relay after the pair of power lines and the ground line are connected to the vehicle and before charging of the electrical storage device is started, and determines, with the ground line breaking relay open, whether there is a disconnection in the ground line based on whether a voltage between at least one of the pair of power lines and the ground line is able to be detected normally.

7. The charging cable according to claim 6, wherein the vehicle further comprises:

a current sensor that is used to control charging of the electrical storage device, wherein when charging of the electrical storage device is temporarily interrupted to calibrate the current sensor after the charging is started, the control unit opens the ground line breaking relay and determines whether there is a disconnection in the ground line.

8. The charging cable according to claim 6, wherein the vehicle comprises:

an electric motor that receives electric power from the electrical storage device to generate power for propelling the vehicle.

9. The charging cable according to claim 8, wherein the vehicle further comprises:

an internal combustion engine that generates power for propelling the vehicle together with the electric motor.

10. The charging cable according to claim 6, further comprising:

a voltage sensor that detects the voltage between at least one of the pair of power lines and the ground line, wherein the voltage sensor outputs a detection result to the control unit.

* * * * *